(12) United States Patent
McDaniel et al.

(10) Patent No.: US 9,034,994 B2
(45) Date of Patent: *May 19, 2015

(54) SYSTEMS AND METHODS FOR REAL-TIME CATALYST PARTICLE SIZE CONTROL IN A POLYMERIZATION REACTOR

(71) Applicant: Chevron Phillips Chemical Company LP, The Woodlands, TX (US)

(72) Inventors: Max P. McDaniel, Bartlesville, OK (US); Joel A. Mutchler, Porter, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/191,485

(22) Filed: Feb. 27, 2014

(65) Prior Publication Data

US 2014/0179881 A1    Jun. 26, 2014

Related U.S. Application Data

(63) Continuation of application No. 13/400,154, filed on Feb. 20, 2012, now Pat. No. 8,703,883.

(51) Int. Cl.
| | |
|---|---|
| *C08F 2/00* | (2006.01) |
| *C08F 2/12* | (2006.01) |
| *C08F 2/34* | (2006.01) |
| *B01J 19/18* | (2006.01) |
| *C08F 210/14* | (2006.01) |
| *B01J 8/08* | (2006.01) |
| *B01J 8/10* | (2006.01) |
| *B01J 8/18* | (2006.01) |

(Continued)

(52) U.S. Cl.
CPC .............. *C08F 210/14* (2013.01); *B01J 8/082* (2013.01); *B01J 8/10* (2013.01); *B01J 8/1809* (2013.01); *B01J 8/224* (2013.01); *B01J 8/36* (2013.01); *B01J 8/0035* (2013.01); *B01J 2208/00672* (2013.01); *B01J 2208/00752* (2013.01); *B01J 2219/002* (2013.01); *B01J 2219/00202* (2013.01); *B01J 2219/00211* (2013.01); *B01J 2219/0024* (2013.01); *Y10S 526/906* (2013.01); *Y10S 526/92* (2013.01)

(58) Field of Classification Search
CPC .............................. C08F 2/14; C08F 2400/02
USPC ........ 526/59, 64, 65, 906, 920; 422/132, 134, 422/105; 241/24.1, 24.25
See application file for complete search history.

(56) References Cited

U.S. PATENT DOCUMENTS

| | | |
|---|---|---|
| 2,825,721 A | 3/1958 | Hogan et al. |
| 3,119,569 A | 1/1964 | Baricordi |

(Continued)

FOREIGN PATENT DOCUMENTS

EP    0 640 625 A2    3/1995

OTHER PUBLICATIONS

Ma, Ying, et al., "A Review of Zeolite-Like Porous Materials," *Microporous and Mesoporous Materials*, 37 (2000), 243-252.

(Continued)

*Primary Examiner* — Fred M Teskin
(74) *Attorney, Agent, or Firm* — Merchant & Gould

(57) ABSTRACT

Polymerization reactor systems providing real-time control of the average particle size of catalyst system components are disclosed. Methods for operating such polymerization reactor systems also are described.

23 Claims, 3 Drawing Sheets

(51) Int. Cl.

| | |
|---|---|
| B01J 8/22 | (2006.01) |
| B01J 8/36 | (2006.01) |
| B01J 8/00 | (2006.01) |
| B02C 4/00 | (2006.01) |
| B02C 15/00 | (2006.01) |
| B02C 19/06 | (2006.01) |
| B02C 23/08 | (2006.01) |

(56) References Cited

U.S. PATENT DOCUMENTS

| | | | |
|---|---|---|---|
| 3,225,023 A | 12/1965 | Hogan et al. | |
| 3,226,205 A | 12/1965 | Rohlfing | |
| 3,242,099 A | 3/1966 | Manyik | |
| 3,248,179 A | 4/1966 | Norwood | |
| 3,622,521 A | 11/1971 | Hogan et al. | |
| 3,625,864 A | 12/1971 | Horvath | |
| 3,887,494 A | 6/1975 | Dietz | |
| 3,900,457 A | 8/1975 | Witt | |
| 3,925,338 A | 12/1975 | Ort | |
| 3,976,632 A | 8/1976 | DeLap | |
| 4,053,436 A | 10/1977 | Hogan et al. | |
| 4,060,480 A | 11/1977 | Reed et al. | |
| 4,081,407 A | 3/1978 | Short et al. | |
| 4,151,122 A | 4/1979 | McDaniel et al. | |
| 4,182,815 A | 1/1980 | McDaniel et al. | |
| 4,247,421 A | 1/1981 | McDaniel et al. | |
| 4,248,735 A | 2/1981 | McDaniel et al. | |
| 4,296,001 A | 10/1981 | Hawley | |
| 4,297,460 A | 10/1981 | McDaniel et al. | |
| 4,301,034 A | 11/1981 | McDaniel | |
| 4,339,559 A | 7/1982 | McDaniel | |
| 4,364,842 A | 12/1982 | McDaniel et al. | |
| 4,364,854 A | 12/1982 | McDaniel et al. | |
| 4,364,855 A | 12/1982 | McDaniel et al. | |
| 4,392,990 A | 7/1983 | Witt | |
| 4,397,766 A | 8/1983 | Hawley et al. | |
| 4,397,769 A | 8/1983 | McDaniel et al. | |
| 4,405,501 A | 9/1983 | Witt | |
| 4,444,962 A | 4/1984 | McDaniel et al. | |
| 4,444,964 A | 4/1984 | McDaniel et al. | |
| 4,444,965 A | 4/1984 | McDaniel et al. | |
| 4,452,910 A | 6/1984 | Hopkins et al. | |
| 4,460,756 A | 7/1984 | McDaniel et al. | |
| 4,501,885 A | 2/1985 | Sherk | |
| 4,504,638 A | 3/1985 | McDaniel et al. | |
| 4,547,557 A | 10/1985 | McDaniel | |
| 4,588,790 A | 5/1986 | Jenkins | |
| 4,735,931 A | 4/1988 | McDaniel et al. | |
| 4,806,513 A | 2/1989 | McDaniel et al. | |
| 4,808,561 A | 2/1989 | Welborn | |
| 4,820,785 A | 4/1989 | McDaniel et al. | |
| 4,855,271 A | 8/1989 | McDaniel et al. | |
| 4,939,217 A | 7/1990 | Stricklen | |
| 4,981,831 A | 1/1991 | Knudsen et al. | |
| 4,988,657 A | 1/1991 | Martin et al. | |
| 5,037,911 A | 8/1991 | McDaniel et al. | |
| 5,064,796 A * | 11/1991 | Speca | 502/107 |
| 5,135,899 A | 8/1992 | Garoff et al. | |
| 5,179,178 A | 1/1993 | Stacy et al. | |
| 5,191,132 A | 3/1993 | Patsidis et al. | |
| 5,210,352 A | 5/1993 | Alt et al. | |
| 5,219,817 A | 6/1993 | McDaniel et al. | |
| 5,221,654 A | 6/1993 | McDaniel et al. | |
| 5,237,025 A | 8/1993 | Benham et al. | |
| 5,244,990 A | 9/1993 | Mitchell | |
| 5,275,992 A | 1/1994 | Mitchell et al. | |
| 5,347,026 A | 9/1994 | Patsidis et al. | |
| 5,352,749 A | 10/1994 | DeChellis | |
| 5,376,611 A | 12/1994 | Shveima | |
| 5,399,636 A | 3/1995 | Alt et al. | |
| 5,401,817 A | 3/1995 | Palackal et al. | |
| 5,420,320 A | 5/1995 | Zenk et al. | |
| 5,436,304 A | 7/1995 | Griffin | |
| 5,436,305 A | 7/1995 | Alt et al. | |
| 5,451,649 A | 9/1995 | Zenk et al. | |
| 5,455,314 A | 10/1995 | Burns | |
| 5,480,848 A | 1/1996 | Geerts | |
| 5,496,781 A | 3/1996 | Geerts et al. | |
| 5,498,581 A | 3/1996 | Welch et al. | |
| 5,541,272 A | 7/1996 | Schmid et al. | |
| 5,554,795 A | 9/1996 | Frey et al. | |
| 5,563,284 A | 10/1996 | Frey et al. | |
| 5,565,175 A | 10/1996 | Hottovy | |
| 5,565,592 A | 10/1996 | Patsidis et al. | |
| 5,571,880 A | 11/1996 | Alt et al. | |
| 5,575,979 A | 11/1996 | Hanson | |
| 5,594,078 A | 1/1997 | Welch et al. | |
| 5,610,247 A | 3/1997 | Alt et al. | |
| 5,627,247 A | 5/1997 | Alt et al. | |
| 5,631,203 A | 5/1997 | Welch et al. | |
| 5,631,335 A | 5/1997 | Alt et al. | |
| 5,641,842 A | 6/1997 | McDaniel et al. | |
| 5,654,454 A | 8/1997 | Peifer et al. | |
| 5,668,230 A | 9/1997 | Schertl et al. | |
| 5,705,478 A | 1/1998 | Boime | |
| 5,705,579 A | 1/1998 | Hawley et al. | |
| 6,107,230 A | 8/2000 | McDaniel et al. | |
| 6,165,929 A | 12/2000 | McDaniel et al. | |
| 6,239,235 B1 | 5/2001 | Hottovy | |
| 6,262,191 B1 | 7/2001 | Hottovy | |
| 6,294,494 B1 | 9/2001 | McDaniel et al. | |
| 6,300,271 B1 | 10/2001 | McDaniel | |
| 6,316,553 B1 | 11/2001 | McDaniel et al. | |
| 6,355,594 B1 | 3/2002 | McDaniel | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel | |
| 6,524,987 B1 | 2/2003 | Collins et al. | |
| 6,548,441 B1 | 4/2003 | McDaniel et al. | |
| 6,548,442 B1 | 4/2003 | McDaniel | |
| 6,576,583 B1 | 6/2003 | McDaniel et al. | |
| 6,613,712 B1 | 9/2003 | McDaniel | |
| 6,632,894 B1 | 10/2003 | McDaniel et al. | |
| 6,645,900 B2 | 11/2003 | De Lange et al. | |
| 6,653,416 B2 | 11/2003 | McDaniel et al. | |
| 6,667,274 B1 | 12/2003 | Hawley et al. | |
| 6,699,947 B1 | 3/2004 | Evertz et al. | |
| 6,750,302 B1 | 6/2004 | McDaniel et al. | |
| 6,831,141 B2 | 12/2004 | McDaniel et al. | |
| 6,833,338 B2 | 12/2004 | McDaniel et al. | |
| 6,833,415 B2 | 12/2004 | Kendrick | |
| 7,294,599 B2 | 11/2007 | Jensen et al. | |
| 7,312,283 B2 | 12/2007 | Martin et al. | |
| 7,417,097 B2 | 8/2008 | Yu et al. | |
| 7,645,841 B2 | 1/2010 | Shaw et al. | |
| 7,696,287 B2 | 4/2010 | Siraux et al. | |
| 7,981,983 B2 | 7/2011 | Lee et al. | |
| 8,703,883 B2 * | 4/2014 | McDaniel et al. | 526/59 |
| 2010/0076167 A1 | 3/2010 | McDaniel et al. | |
| 2010/0130704 A1 | 5/2010 | Hottovy et al. | |

OTHER PUBLICATIONS

Davis, Mark E., et al., "Zeolite and Molecular Sieve Synthesis," *Chem. Mater.*, 1992, 4, 756-768.

Davis, Mark E., "Zeolites and Molecular Sieves: Not Just Ordinary Catalysts," *Ind. Eng. Chem. Res.*, 1991, 30, 1675-1683.

Meier, W. M. et al., "Atlas of Zeolite Structure Types," *Structure Commission of the International Zeolite Association*, Butterworth & Co., 1987, 1-11.

Barrer, R. M., "Hydrothermal Chemistry of Zeolites," *Academic Press*, 1982, 1-43.

T.J. Pinnavaia, *Science 220* (4595), 365-371 (1983).

M. Thomas, Intercalation Chemistry, (S. Whittington and A. Jacobson, eds.) Ch. 3, pp. 55-99, Academic Press, Inc., (1982).

Pérez-Maqueda, et al. "Effect of Sonication on Particle-Size Distribution in Natural Muscovite and Biotite," The Clay Minerals Society, Clays and Clay Minerals, vol. 51, No. 6, 701-708, 2003.

Santos, et al. "Synthesis of Mesoporous Titania in Rutile Phase With Pore-Stable Structure," Brazilian Journal of Chemical Engineering, vol. 26, No. 03, pp. 555-561, Jul.-Sep. 2009.

(56) References Cited

OTHER PUBLICATIONS

"For Particles, Size Matters," retrieved from May 2001 CEP Magazine. pp. 11-21. Obtained at: www.aiche.org/cep/.

Barrett, Paul, "Selecting In-Process Particle-Size Analyzers," retrieved from Aug. 2003 CEP Magazine. pp. 26-32. Obtained at www.cepmagazine.org.

Clement et al., "Narrowing Down Equipment Choices for Particle-Size Reduction," retrieved from Jun. 2002 CEP Magazine. pp. 50-54. Obtained at: www.cepmagazine.org.

Pugh, David, "Sizing Up Online Particle Size Analysis," retrieved from May 2007 CEP Magazine. p. 23. Obtained at www.aiche.org/cep.

"Comminution". Obtained on Jun. 30, 2011 at http://en.wikipedia.org/wiki/Comminution, 1 page.

Product Digest "Solids Handling" retrieved from Oct. 2004 CEP Magazine. p. 38. Obtained at: www.cepmagazine.org.

Product Digest "Size Reduction" retrieved from Jun. 2001 CEP Magazine. pp. 54-55. Obtained at: www.aiche.org.cep/.

ASTM D1921 entitled "Standard Test Methods for Particle Size (Sieve Analysis) of Plastic Materials," published in ASTM International, Oct. 2001, 5 pages.

Hawley's Condensed Chemical Dictionary, 11th Ed., John Wiley & Sons, 1995, 3 pages.

Cotton et al., Advanced Inorganic Chemistry, 6th Ed., Wiley-Interscience, 1999, 4 pages.

\* cited by examiner

SYSTEMS AND METHODS FOR REAL-TIME CATALYST PARTICLE SIZE CONTROL IN A POLYMERIZATION REACTOR

REFERENCE TO RELATED APPLICATION

This application is a continuation application of co-pending U.S. patent application Ser. No. 13/400,154, filed on Feb. 20, 2012, now U.S. Pat. No. 8,703,883, the disclosure of which is incorporated herein by reference in its entirety.

BACKGROUND OF THE INVENTION

This disclosure is directed generally to the real-time particle size control of catalyst system components used in the commercial production of polymers.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various polymerization reactor systems that can provide real-time control of the average particle size of certain catalyst system components are disclosed herein. One such polymerization reactor system can comprise:

(a) a comminution device configured to reduce a first catalyst system component, having a first average particle size, to produce a reduced catalyst system component having a reduced average particle size;

(b) a polymerization reactor configured to contact a transition metal-based catalyst system comprising the reduced catalyst system component with an olefin monomer under polymerization conditions to produce an olefin polymer; and (c) a controller operative to control the reduced average particle size according to a process variable in the polymerization reactor system and/or according to a property of the olefin polymer.

Various methods are disclosed herein for operating a polymerization reactor system, or for controlling a polymerization reaction in a polymerization reactor system, that can provide real-time control of the average particle size of certain catalyst system components. One such method can comprise:

(i) reducing an average particle size of a first catalyst system component to produce a reduced catalyst system component having a reduced average particle size;

(ii) introducing a transition metal-based catalyst system comprising the reduced catalyst system component and an olefin monomer into a polymerization reactor within the polymerization reactor system;

(iii) contacting the transition metal-based catalyst system comprising the reduced catalyst system component with the olefin monomer under polymerization conditions to produce an olefin polymer;

(iv) monitoring a process variable in the polymerization reactor system and/or a property of the olefin polymer, and (v) when the process variable and/or the property has/have reached a predetermined level, adjusting the reduced average particle size.

Both the foregoing summary and the following detailed description provide examples and are explanatory only. Accordingly, the foregoing summary and the following detailed description should not be considered to be restrictive.

Further, features or variations may be provided in addition to those set forth herein. For example, certain embodiments may be directed to various feature combinations and sub-combinations described in the detailed description.

DEFINITIONS

Figure 1:
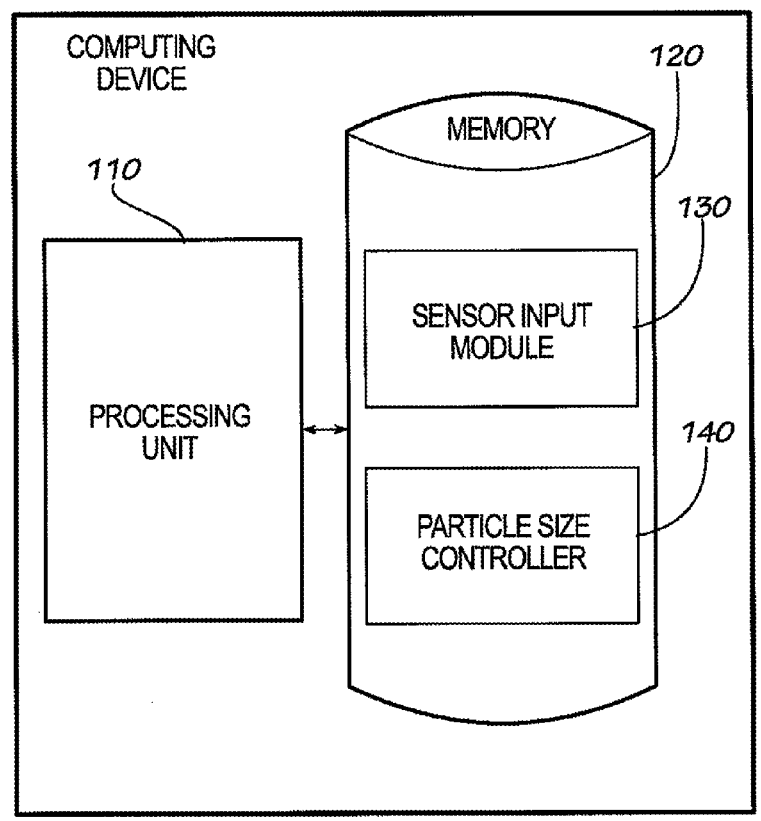
FIG. 1 presents a schematic diagram of an illustrative controller or computing device.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while compositions, systems, and methods are often described in terms of "comprising" various components, devices, or steps, the compositions, systems, and methods can also "consist essentially of" or "consist of" the various components, devices, or steps, unless stated otherwise.

The terms "a," "an," and "the" are intended to include plural alternatives, e.g., at least one. For instance, the disclosure of "a polymerization reactor," "a catalyst system," "a controller," "an olefin comonomer," etc., is meant to encompass one, or mixtures or combinations of more than one, polymerization reactor, catalyst system, controller, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methylbutane, and 2,2-dimethylpropane; and a general reference to a butyl group includes a n-butyl group, a sec-butyl group, an iso-butyl group, and a t-butyl group.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials having three or more hydrogen atoms, as necessary for the situation, removed from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that the ratio of the average particle size of a first catalyst system component to the average particle size of a reduced catalyst system component can be in a range from about 1.5:1 to about 15:1 in certain embodiments. By a disclosure that this ratio can be in a range from about 1.5:1 to about 15:1, Applicants intend to recite that the ratio can be about 1.5:1, about 1.75:1, about 2:1, about 2.5:1, about 3:1, about 4:1, about 5:1, about 6:1, about 7:1, about 8:1, about 9:1, about 10:1, about 11:1, about 12:1, about 13:1, about 14:1, or about 15:1. Additionally, the ratio can be within any range from about 1.5:1 to about 15:1 (for example, the ratio can be in a range from about 1.5:1 to about 3:1), and this also includes any combination of ranges between about 1.5:1 and about 15:1. Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers (including dimers, trimers, etc.) derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Transition metal-based catalyst systems described herein comprise a catalyst system component. As used herein, a "catalyst system component" is meant to encompass any component (one or more) or all of the components of the catalyst system. Thus, for example, the catalyst system component can be (or can comprise) an inert component (e.g., an inert support), an activator component (e.g., a treated solid oxide), or a finished/active catalyst system (e.g., a chromium/silica-titania catalyst), etc.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are polymerization reactor systems and methods for operating or controlling such systems. These systems and methods can provide real-time control of the average particle size of certain catalyst system components. While not wishing to be bound by theory, Applicants believe that such reactors systems (and related methods) can offer several advantages over existing catalyst component particle size control.

Generally, the average particle sizes of commercial catalyst system components can be relatively large, allowing for easier handling and transport, and less fines and dust during pre-polymerization processing steps such as activation, calcination, feeding, transfer, and the like. However, these relatively large catalyst system components often can be problematic in a polymerization process, for instance, providing reduced catalytic activity, lower percent solids, higher circulation pump power consumption, and increased fouling in a loop slurry reactor. On the other hand, catalyst system components with a relatively small average particle size can overcome the polymerization process deficiencies of relatively large average particle sizes, however, relatively small average particle size components can be more difficult to handle and transport, can be more problematic in activation and/or calcination steps (e.g., entrainment of fines and plugging in filters), and can be more expensive, notwithstanding that relatively small average particle sizes for some catalyst system components are not commercially available.

One potential benefit disclosed herein is the ability of the polymerization reactor system to employ incoming catalyst system components of relatively large average particle size, which are easier to handle at the pre-polymerization stage, and convert these catalyst components to a relatively smaller average particle size that may be better suited for certain polymerization processes and reactor types.

Another potential benefit disclosed herein is the ability to control (e.g., adjust) the average particle size of a catalyst system component amongst all polymer resin grades that use that catalyst system component. For instance, an average particle size of a catalyst system component may be 45 microns in order to maximize reactor system efficiency for polymer resin grade A, but the average particle size of the catalyst system component may be only 25 microns in order to maximize reactor system efficiency for polymer resin grade B. In many polymerization processes, up to 50 or 100, or more, different grades of polymer resin, each of which may have a specific average particle size of a catalyst system component that maximizes reactor system efficiency (or improves the polymerization process, or improves the resulting olefin polymer in some manner, etc.). It is unrealistic and commercially unviable for a polymerization operation to source 50 or 100 different average particle size versions of the same catalyst system component. Moreover, for a particular catalyst system component, there are often only a few average particle size versions that are commercially available, and more often, none that are available at relatively small average particle sizes.

In addition to the ability to control/adjust the average particle size of a catalyst system component amongst all polymer resins grades, yet another benefit disclosed herein is the ability to control/adjust the average particle size of a catalyst system component within a specific polymer resin grade, e.g., the particle size can be adjusted or controlled while a particular grade of resin is being produced. Thus, even if an average particle size of a catalyst system component were 45 microns in order to maximize reactor system efficiency, in general, for a given polymer resin grade, fine-tuning likely will be required based on various polymerization process variables and/or desired polymer properties. Accordingly, the polymerization reactor systems disclosed herein can permit real-time monitoring, control, adjustment, and/or tuning of the average particle sizes of catalyst system components within the production run of an individual grade of polymer resin.

Polymerization Reactor Systems

Various polymerization reactor systems that can provide real-time control of the average particle size of catalyst system components, and methods for operation or controlling such systems, are disclosed and described herein. For instance, in one embodiment, a polymerization reactor system can comprise (a) a comminution device configured to reduce a first catalyst system component, having a first average particle size, to produce a reduced catalyst system component having a reduced average particle size; (b) a polymerization reactor configured to contact a transition metal-based catalyst system comprising the reduced catalyst system component with an olefin monomer under polymerization conditions to produce an olefin polymer; and (c) a controller operative to control the reduced average particle size according to a process variable in the polymerization reactor system and/or according to a property of the olefin polymer.

Generally, the features of any of the polymerization reactor systems disclosed herein (e.g., the comminution device, the first catalyst system component and its respective average particle size, the reduced catalyst system component and its respective average particle size, the polymerization reactor, the catalyst system, the olefin monomer (and olefin comonomer, if any), the polymerization conditions, the olefin polymer, the controller, the process variable in the reactor system, the property of the olefin polymer, among others) are independently described herein, and these features can be combined in any combination to further describe the disclosed polymerization reactor systems. Moreover, other devices or reactor system components in addition to a comminution device, a polymerization reactor, and a controller, can be present in the disclosed polymerization reactor systems, unless stated otherwise. Additionally, the catalyst system can be contacted with an olefin monomer and an olefin comonomer (one or more) in the polymerization reactor in certain embodiments contemplated herein.

The comminution device can be any device that is capable of reducing the average particle size of a component of a transition-metal based catalyst system. For instance, non-limiting examples of suitable comminution devices can include an impact crusher, a hammer mill, a jet mill, a roll mill, a roll crusher, a jaw crusher, an ultrasonic device, and the like, and including combinations of two or more of these devices. Typically, the input to the comminution device can be referred to as a first catalyst system component, and the output from the comminution device can be referred to as a reduced catalyst system component. As used herein, the "first" catalyst system component is meant to indicate a larger size (e.g., coarse), while the "reduced" catalyst system component is meant to indicate a smaller size (e.g., fine), i.e., the average particle size of the first catalyst system component is greater than the average particle size of the reduced catalyst system component. In some embodiments, the first catalyst system component can be the grade of that component that is commercially available, and often, at an average particle size that is larger than desired for the polymerization reactor system.

The average particle size can be determined from a particle size distribution (PSD) curve using various types of equipment and procedures (e.g., ASTM 1921). Any disclosure of an average particle size is meant to encompass the average particle size on a number basis as well the average particle size on a volume basis (e.g., the average particle size in the volume basis generally can be dominated by larger particles and can be less sensitive to fines). Thus, by stating that the average particle size of the first catalyst system component can be reduced to form the reduced catalyst system component, this encompasses both the average particle size (on a number basis) of the first catalyst system component can be reduced to form the reduced catalyst system component, and the average particle size (on a volume basis) of the first catalyst system component can be reduced to form the reduced catalyst system component. In situations where the average particle sizes of the first catalyst system component and the reduced catalyst system component are compared, the average particle sizes should be compared on the same basis, i.e., either on a number basis or on a volume basis.

Regardless, it is not required that the actual average particle size of the first catalyst system component and/or the actual average particle size of the reduced catalyst system component be known, so long as the size reduction is controlled or adjusted as described herein. Of course, incoming first catalyst system components having larger average particle sizes may require more size reduction that incoming catalyst system components having smaller average particle sizes.

While the average particle size is reduced from the first catalyst system component to the reduced catalyst system component, it is not required that the particle size distribution be impacted. Hence, it is contemplated that the particle size distribution of the reduced catalyst system component can be narrower, broader, or relatively the same as the particle size distribution of the first catalyst system component.

Moreover, in some embodiments, the comminution device can function by crushing or reducing only the largest particles of the first catalyst system component, while allowing the smaller size particles to pass through the comminution device relatively unaffected. In such embodiments, the larger catalyst system component particles can be selectively reduced in size. As an example, the comminution device can be a crusher configured as two rollers spaced at an appropriate distance apart to break or crush only the particles with sizes that exceed a specified roller distance. While this embodiment largely focuses on limiting the maximum particle size of the first catalyst system component, such size reduction will inevitably reduce the average particle size of the first catalyst system component and, therefore, is encompassed herein.

Consistent with embodiments of the polymerization reactor systems disclosed herein, the first catalyst system component that may require a reduction in particle size often can have an average particle size, prior to entering the comminution device, of at least about 100 microns, at least about 125 microns, at least about 150 microns, at least about 175 microns, or at least about 200 microns (on a number basis and/or on a volume basis). Suitable ranges for the average particle size of the first catalyst system component, prior to entering the comminution device, can include, but are not limited to, the following ranges: from about 100 to about 1000 microns; alternatively, from about 200 to about 1000 microns; alternatively, from about 100 to about 750 microns; alternatively, from about 100 to about 500 microns; alternatively, from about 100 to about 250 microns; alternatively, from about 100 to about 200 microns; alternatively, from about 125 to about 1000 microns; alternatively, from about 125 to about 500 microns; alternatively, from about 150 to about 750 microns; alternatively, from about 150 to about 500 microns; alternatively, from about 150 to about 350 microns; or alternatively, from about 200 to about 400 microns.

The average particle size of the reduced catalyst system component, after exiting the comminution device, generally can be less than about 75 microns, for example, less than about 70 microns, less than about 60 microns, less than about 50 microns, less than about 35 microns, less than about 25 microns, or less than about 15 microns (on a number basis and/or on a volume basis). Suitable ranges for the average particle size of the reduced catalyst system component, after exiting the comminution device, can include, but are not limited to, the following ranges: from about 1 to about 75 microns; alternatively, from about 1 to about 50 microns; alternatively, from about 5 to about 75 microns; alternatively, from about 5 to about 50 microns; alternatively, from about 10 to about 75 microns; alternatively, from about 10 to about 50 microns; alternatively, from about 15 to about 50 microns; alternatively, from about 20 to about 40 microns; alternatively, from about 10 to about 30 microns; alternatively, from about 30 to about 60 microns; or alternatively, from about 25 to about 75 microns.

In addition or alternatively to describing the average particle sizes of the first catalyst system component and the reduced catalyst system component, the size reduction can be described in terms of the ratio of the average particle size of the first catalyst system component to the average particle size of the reduced catalyst system component. In one embodiment, this ratio can be in a range from about 1.5:1 to about 100:1. In another embodiment, this ratio can be in a range from about 1.5:1 to about 50:1, from about 1.5:1 to about 25:1, or from about 1.5:1 to about 15:1. In yet another embodiment, the ratio of the average particle size of the first catalyst system component to the average particle size of the reduced catalyst system component can be in a range from about 1.5:1 to about 10:1, from about 2:1 to about 10:1, from about 1.5:1 to about 5:1, or from about 2:1 to about 5:1. These ratios apply for first:reduced average particle size ratios determined on a number basis, and/or for first:reduced average particle size ratios determined on a volume basis.

In some embodiments, the output of the comminution device (e.g., the reduced catalyst system component) can be fed directly into a polymerization reactor, while in other embodiments, the output of the comminution device can be fed indirectly into the polymerization reactor (e.g., the reduced catalyst component leaving the comminution device can be delivered to a catalyst storage vessel, a catalyst mix tank, a catalyst feed tank, etc., from which that catalyst component can be subsequently delivered to the polymerization reactor, as-needed). Moreover, the controller can control (e.g., adjust) the output rate of the comminution device (e.g., the amount of the reduced catalyst system component) that enters the polymerization reactor. Regardless of the manner or amount of delivery from the comminution device, the disclosed polymerization reactor systems and methods of operating same are intended to encompass any olefin polymerization process using any/all types of polymerization reactors and polymerization reaction conditions. As used herein, "polymerization reactor" includes any polymerization reactor capable of polymerizing (inclusive of oligomerizing) olefin monomers and comonomers (one or more than one comonomer, if used) to produce homopolymers, copolymers, terpolymers, and the like. The various types of polymerization reactors include those that can be referred to as a slurry reactor, gas-phase reactor, solution reactor, high pressure reactor, tubular reactor, autoclave reactor, and the like, including combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

A polymerization reactor system can comprise one type of polymerization reactor or multiple reactors of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some embodiments, the polymerization reactor system can comprise any combination of a raw material feed system, a feed system for catalyst and/or catalyst components, and/or a polymer recovery system. In other embodiments, suitable reactor systems can comprise systems for feedstock purification, catalyst storage and preparation, extrusion, reactor cooling, polymer recovery, fractionation, recycle, storage, load-out, laboratory analysis, and process control.

Optionally, the polymerization reactor system can comprise a particle size analyzer for determining the average particle size of the first and/or reduced catalyst system component. While the determination of the average particle sizes of these catalyst system components is not required, it can be beneficial in some embodiments to ascertain the average particle size of the first catalyst system component and/or the reduced catalyst system component. The particle size analyzer, in certain embodiments, can be an in-process particle size analyzer, for instance, to provide real-time particle size data. Any suitable in-process particle size analyzer can be used, such as those employing focused-beam reflectance measurement or particle vision measurement, amongst others.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor, the polymer grade, and so forth. In some reactor systems, the polymerization reactor temperature generally can be within a range from about 70° C. to about 105° C., or from about 75° C. to about 100° C.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 to 500 psig range (1.4 MPa to 3.4 MPa). High pressure polymerization in tubular or autoclave reactors generally can be conducted at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages. As an example, a representative set of polymerization conditions can include, among others, a polymerization reaction temperature in a range from about 60° C. to about 110° C. (or from about 70° C. to about 90° C.), and a reaction pressure in a range from about 200 to about 1000 psig (about 1.4 to about 6.9 MPa).

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, stereoregularity, crack growth, long chain branching, and rheological measurements.

Embodiments contemplated herein also are directed to, and encompass, the polymers produced by any of the polymerization reactor systems and methods disclosed herein. Articles of manufacture can be formed from, and/or can comprise, the polymers produced in accordance with the systems and methods described herein.

The disclosed polymerization reactor systems can comprise a controller, the controller being operative to control (e.g., adjust) an average particle size of the reduced catalyst system component according to a process variable in the polymerization reactor system and/or according to a property of the olefin polymer. In one embodiment, the controller can comprise a processing unit. In another embodiment, the controller can be programmed with an algorithm to control the average particle size of the reduced catalyst system component based on a process variable in the polymerization reactor system and/or on a property of the olefin polymer. In yet another embodiment, the controller operative to control the average particle size of the reduced catalyst system component can comprise a controller operative to receive information on the process variable and/or the property of the olefin polymer (e.g., from a sensor or other source), to identify a new target average particle size of the reduced catalyst system component (e.g., increase or decrease the size of the reduced catalyst system component to achieve a desired impact on the process variable and/or on the property of the olefin polymer), and to provide a control signal to the comminution device operative to change the amount of size reduction achieved by the comminution device.

The process variable to be controlled in the polymerization reactor system and/or the property of the olefin polymer to be controlled, collectively, can comprise, for example, an average particle size of the olefin polymer, a maximum particle size of the olefin polymer, a particle size distribution of the olefin polymer, a bulk density of the olefin polymer, a production rate of the olefin polymer, a catalyst activity of the transition metal-based catalyst system, a heat transfer coefficient of the polymerization reactor, a percent solids (by weight and/or by volume) in a loop slurry reactor, a slurry density in a loop slurry reactor, a circulation velocity of a slurry in a loop slurry reactor, a pump pressure drop in a loop slurry reactor, a pump power consumption in a loop slurry reactor, a fluidizing gas velocity in a fluidized bed reactor, a bed density in a fluidized bed reactor, a bed height in a fluidized bed reactor, a gas/powder ratio in a fluidized bed reactor, a static build-up in a fluidized bed reactor, and the like, or a combination of any of these variables/properties. As one of skill in the art will recognize, certain process variables and/or polymer properties may be more applicable to certain types or polymerization reactors, and certain process variables and/or polymer properties may be more or less important to monitor either within a production run of a particular polymer resin grade or when transitioning between polymer resin grades.

The controller can be operated on an as-needed basis, at set time intervals, or continuously (e.g., not including time periods where grade changes or transitioning between grades is occurring), depending upon the requirements of the reactor system. Thus, it is contemplated that the average particle size of the reduced catalyst system component can be monitored and/or adjusted and/or controlled continuously.

FIG. 1 illustrates a representative controller or computing device 100 that can be employed in embodiments disclosed herein. The controller or computing device 100 can comprise a processing unit 110 and a memory unit 120. Memory 120 can comprise, for example, a sensor input module 130 operative to receive data inputs, e.g., information on a process variable in the polymerization reactor system and/or information on a property of an olefin polymer produced in the polymerization reactor. Memory 120 can further comprise a particle size controller 140 operative to provide output signals to a comminution device to adjust or control the amount of size reduction performed by the comminution device. While executing on processing unit 110, sensor input module 130 and/or particle size controller 140 can perform processes for providing various embodiments as described herein. In an embodiment, the processing unit 110 can receive information about the process and/or polymer from the sensor input module 130, process that information and determine that an increase or decrease in the size of the of the reduced catalyst system component may be required to achieve the desired impact on the process and/or polymer, and communicate with the particle size controller 140 to affect the amount of size reduction performed by the comminution device.

The controller or computing device 100 can be implemented using a personal computer, a network computer, a server, a mainframe, or other similar microcomputer-based workstation. The controller or computing device 100 can comprise any computer operating environment, such as handheld devices, multiprocessor systems, microprocessor-based or programmable sender electronic devices, minicomputers, mainframe computers, and the like. The controller or computing device 100 also can be practiced in distributed computing environments where tasks are performed by remote processing devices. Furthermore, the controller or computing device 100 can comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples, and the controller or computing device 100 can comprise other systems or devices. Controller or computing device 100 also can be implemented via a system-on-a-chip (SOC) where each and/or many of the components illustrated above can be integrated onto a single integrated circuit. Such an SOC device can include one or more processing units, graphics units, communications units, system virtualization units and various application functionalities, all of which can be integrated (or "burned") onto the chip substrate as a single integrated circuit.

As a non-limiting example, the controller can adjust the average particle size of the reduced catalyst system component to increase and/or to maximize the amount of solids in a loop slurry reactor, as a function of process variables such as, for example, slurry density, percent solids, pump power consumption, reactor heat transfer coefficient, and the like. In an embodiment, the average particle size of the reduced catalyst system component can be decreased gradually, thereby causing a gradual increase in the slurry density and percent solids, which can be increased up to a point at which the reactor heat transfer decreases and/or the pump power consumption increases by a certain amount or to a certain predetermined level. In this embodiment, the breadth of the particle size distribution of the reduced catalyst system component can be maintained, and not narrowed, since a narrower particle size distribution can adversely affect the overall packing and amount of solids in the loop reactor.

Methods of Operating Polymerization Reactor Systems

Various methods for operating a polymerization reactor system, or for controlling a polymerization reaction in a polymerization reactor system, are disclosed herein. One such method consistent with the disclosed embodiments for operating a polymerization reactor system can comprise (i) reducing an average particle size of a first catalyst system component to produce a reduced catalyst system component having a reduced average particle size; (ii) introducing a transition metal-based catalyst system comprising the reduced catalyst system component and an olefin monomer into a polymerization reactor within the polymerization reactor system; (iii) contacting the transition metal-based catalyst system comprising the reduced catalyst system component with the olefin monomer under polymerization conditions to produce an olefin polymer; (iv) monitoring a process variable in the polymerization reactor system and/or a property of the olefin polymer, and (v) when the process variable and/or the property has/have reached a predetermined level, adjusting the reduced average particle size.

Generally, the features of any of the methods disclosed herein (e.g., the first catalyst system component and its respective average particle size, the reduced catalyst system component and its respective average particle size, the polymerization reactor, the catalyst system, the olefin monomer (and olefin comonomer, if any), the polymerization conditions, the olefin polymer, the process variable in the reactor system, the property of the olefin polymer, among others) are independently described herein, and these features can be combined in any combination to further describe the disclosed methods. Moreover, other process steps can be conducted before, during, and/or after any of the steps listed in the disclosed methods, unless stated otherwise.

In step (i), various methods of reducing particle size can be employed, and typically, such methods can comprise at least one of impact, shear, compression, vibration (e.g., ultrasonic vibration), grinding, and crushing, as well as combinations of two or more of these size reduction mechanisms. As discussed herein above, the particle size can be reduced using any suitable comminution device, including but not limited to, an impact crusher, a hammer mill, a jet mill, a roll mill, a roll crusher, a jaw crusher, an ultrasonic device, and the like, or any combination thereof.

After the average particle size of the first catalyst system component has been reduced to yield the reduced catalyst system component in step (i), the reduced catalyst system component can be introduced (e.g., added, fed, injected, etc.) directly into the polymerization reactor, although this is not a requirement.

The polymerization reactor can be any polymerization reactor disclosed herein, such as a slurry reactor (e.g., a loop slurry reactor), a gas phase reactor (e.g., a fluidized bed reactor), a solution reactor, and the like, and including dual reactor or multi reactor combinations thereof. The polymerization conditions used in the reactor can depend upon the respective reactor type, and are well known to those of skill in the art. In some embodiments, the polymerization conditions can comprise a polymerization reaction temperature in a range from about 60° C. to about 110° C. and a reaction pressure in a range from about 200 to about 1000 psig (about 1.4 to about 6.9 MPa).

In the methods disclosed herein, a catalyst system (including the reduced catalyst system component) and an olefin monomer (and olefin comonomer(s), if any) can be contacted in a polymerization reactor. As would be recognized by one of skill in the art, additional components can be introduced or added into the reactor and contacted with the catalyst system and the olefin monomer (and olefin comonomer(s), if any), and such unrecited components are encompassed herein. For instance, in the operation of a polymerization reactor system—depending, of course, on the desired olefin polymer, among other factors—solvents and/or diluents, recycle streams, hydrogen, etc., also can be present in the reactor and/or polymerization reactor system.

Various process variables in the polymerization reactor system and/or properties of the olefin polymer can be monitored in the methods disclosed herein for operating a polymerization reactor system (or for controlling a polymerization reaction in a polymerization reactor system). The process variable in the polymerization reactor system and/or the property of the olefin polymer, collectively, can encompass, for example, an average particle size of the olefin polymer, a maximum particle size of the olefin polymer, a particle size distribution of the olefin polymer, a bulk density of the olefin polymer, a production rate of the olefin polymer, a catalyst activity of the transition metal-based catalyst system, a heat transfer coefficient of the polymerization reactor, a percent solids in a loop slurry reactor, a slurry density in a loop slurry reactor, a circulation velocity of a slurry in a loop slurry reactor, a pump pressure drop in a loop slurry reactor, a pump power consumption in a loop slurry reactor, a fluidizing gas velocity in a fluidized bed reactor, a bed density in a fluidized bed reactor, a bed height in a fluidized bed reactor, a gas/powder ratio in a fluidized bed reactor, a static build-up in a fluidized bed reactor, and the like, or a combination of any of these variables/properties. When the process variable and/or the property has/have reached a predetermined level, the average particle size of the reduced catalyst system component can be adjusted. This adjustment in the average particle size of the reduced catalyst component can occur periodically (as-needed), at set time intervals, or continuously, depending upon the requirements of the polymerization process. Optionally, the method for operating a polymerization reactor system can further comprise a step of determining the average particle size of the reduced catalyst system component, e.g., using in-process particle size analysis (e.g., focused-beam reflectance measurement, particle vision measurement, etc.), using off-line particle size analysis (laser diffraction, electrosensing zone methodology, etc.), or a combination thereof, although this is not a requirement.

Consistent with embodiments disclosed herein, the average particle size of the reduced catalyst system component can be adjusted when the process variable and/or the property has/have reached a predetermined level. The predetermined level can be ascertained by one of skill in the art depending upon, for instance, the historic and the prevailing conditions in the polymerization reactor system. As non-limiting examples, a predetermined level may be a decrease of a certain percentage (e.g., above a percentage that is deemed allowable during normal on-prime production) of the production rate of the olefin polymer, and/or a decrease in the catalyst activity of the transition-metal based catalyst system, and/or a decrease in the heat transfer coefficient in a loop slurry reactor, and/or an increase of circulation pump ΔP in a loop slurry reactor, and/or a decrease in percent solids or slurry density in a loop slurry reactor, and/or an increase in circulation pump power consumption in a loop slurry reactor, and/or an increase in the average particle size or bulk density of the olefin polymer, and so forth.

Catalyst Systems

The methods disclosed herein are applicable to any catalyst system (e.g., any transition metal-based catalyst system) suitable for the polymerization of an olefin monomer, but are not limited thereto. The catalyst system can comprise, for example, a transition metal (one or more than one) from Groups IIIB-XB of the Periodic Table of the Elements. In one embodiment, the catalyst system can comprise a Group III, IV, V, or VI transition metal, or a combination of two or more transition metals. The catalyst system can comprise chromium, titanium, zirconium, hafnium, vanadium, or a combination thereof, in some embodiments, or can comprise chromium, titanium, zirconium, hafnium, or a combination thereof, in other embodiments. Accordingly, the catalyst system can comprise chromium, or titanium, or zirconium, or hafnium, either singly or in combination. Thus, catalyst systems comprising two or more transition metal compounds, wherein each transition metal compound independently can comprise chromium, titanium, zirconium, hafnium, vanadium, or a combination thereof, are contemplated and encompassed herein.

Various catalyst systems known to a skilled artisan are useful in the polymerization of olefins. These include, but are not limited to, Ziegler-Natta based catalyst systems, chromium-based catalyst systems, metallocene-based catalyst systems, and the like, including combinations thereof. The methods disclosed herein are not limited to the aforementioned catalyst systems, but Applicants nevertheless contemplate particular embodiments directed to these catalyst systems. Hence, the catalyst system can be a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. In one embodiment, the catalyst system can be a dual catalyst system comprising at least one metallocene compound, while in another embodiment, the catalyst system can be a dual catalyst system comprising two different metallocene compounds.

Examples of representative and non-limiting catalyst systems include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 3,887,494, 3,900,457, 4,053,436, 4,081,407, 4,296,001, 4,392,990, 4,405,501, 4,981,831, 4,151,122, 4,247,421, 4,248,735, 4,297,460, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,887,494, 3,119,569, 3,900,457, 4,981,831, 4,364,842, 4,444,965, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

In some embodiments, the catalyst system, in addition to a transition metal compound, can comprise an activator and an optional co-catalyst. Illustrative activators can include, but are not limited to, aluminoxane compounds, organoboron or organoborate compounds, ionizing ionic compounds, activator-supports (e.g., a solid oxide treated with an electron-withdrawing anion), and the like, or combinations thereof. Commonly used polymerization co-catalysts can include, but are not limited to, metal alkyl, or organometal, co-catalysts, with the metal encompassing boron, aluminum, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, including combinations thereof. In these and other embodiments, the transition metal compound can comprise a metallocene compound and/or a chromium compound.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal (a), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{24}$ olefin; alternatively, a $C_2$-$C_{12}$ olefin; alternatively, a $C_6$-$C_{24}$ olefin; alternatively, a $C_2$-$C_{10}$ α-olefin; alternatively, propylene, 1-butene, 1-pentene, 1-hexene, 1-heptene, 1-octene, 1-decene, or styrene; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer. According to one embodiment, the olefin monomer in the polymerization process can comprise ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another embodiment, the olefin monomer can comprise ethylene and the olefin comonomer can comprise an α-olefin, while in yet another embodiment, the comonomer can comprise propylene, 1-butene, 1-pentene, 1-hexene, 1-octene, 1-decene, styrene, or any combination thereof; or alternatively, the olefin comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, ethylene/1-octene, etc.), a propylene random copolymer, a propylene block copolymer, and the like, including combinations thereof. Moreover, the olefin polymer (or oligomer) can comprise, in certain embodiments, an olefin dimer, olefin trimer, olefin tetramer, etc., and including mixtures or combinations thereof. Thus, olefin polymer encompasses oligomerization products of $C_6$-$C_{24}$ olefins (or $C_6$-$C_{24}$ α-olefins, or 1-hexene, or 1-octene, or 1-decene, or 1-dodecene, or 1-tetradecene, or 1-hexadecene, etc.)

Solid Oxides

In some embodiments, the first and/or reduced catalyst component can comprise (or consist essentially of, or consist of) a solid oxide. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the solid inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used as components of a catalyst system can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as alumina, "mixed oxide" compounds thereof such as silica-alumina, and combinations or mixtures of more than one solid oxide material. Mixed oxides such as silica-alumina can be single or multiple chemical phases with more than one metal combined with oxygen to form the solid oxide. Examples of mixed oxides that can be used herein include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. Silica-coated aluminas are encompassed herein; such oxide materials are described in, for example, U.S. Patent Publication No. 2010-0076167, the disclosure of which is incorporated herein by reference in its entirety.

The percentage of each oxide in a mixed oxide can vary depending upon the respective oxide materials. As an example, a silica-alumina typically has an alumina content from 5 to 95% by weight. According to one embodiment, the alumina content of the silica-alumina can be from 5 to 50%, or from 8% to 30%, alumina by weight. In another embodiment, high alumina content silica-alumina compounds can be employed, in which the alumina content of these silica-alumina materials typically ranges from 60% to 90%, or from 65% to 80%, alumina by weight.

In one embodiment, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another embodiment, the solid oxide can comprise silica, alumina, titania, zirconia, magnesia, boria, zinc oxide, a mixed oxide thereof, or any mixture thereof. For instance, the solid oxide can comprise silica, alumina, titania, or a combination thereof; alternatively, silica; alternatively, alumina; alternatively, titania; alternatively, zirconia; alternatively, magnesia; alternatively, boria; or alternatively, zinc oxide.

In some embodiments, the solid oxide can have a pore volume greater than 0.1 cc/g, or alternatively, greater than 0.5 cc/g. Often, the solid oxide can have a pore volume greater than 1.0 cc/g. Additionally, or alternatively, the solid oxide can have a surface area greater than 100 $m^2$/g; alternatively, greater than 250 $m^2$/g; or alternatively, greater than 350 $m^2$/g. For example, the solid oxide can have a surface area of from 100 to 1000 $m^2$/g, from 200 to 800 $m^2$/g, or from 250 to 600 $m^2$/g.

Activator-Supports

In some embodiments, the first and/or reduced catalyst component can comprise (or consist essentially of, or consist of) an activator-support (also referred to as a treated solid oxide, or a chemically-treated solid oxide). The solid oxide can be any solid oxide disclosed or described herein. In some embodiments, the treated solid oxide can comprise an acid-functionalized solid oxide, a base-functionalized solid oxide, or a combination thereof; alternatively, an acid-functionalized solid oxide; or alternatively, a base-functionalized solid oxide. For example, a mixture or combination of an acid-functionalized solid oxide and a base-functionalized solid oxide can be employed, or a solid oxide that has been both acid-functionalized and base-functionalized can be employed. In another embodiment, the treated solid oxide can comprise a solid oxide that has been treated to increase its hydrophobicity. Such hydrophobic-treated solid oxides also can be acid-functionalized or base-functionalized prior to, during, or after the treatment to increase the material's hydrophobicity. In an embodiment, the treated solid oxide can comprise an acid-functionalized solid oxide, a base-functionalized solid oxide, a hydrophobic-functionalized solid oxide, or a combination thereof.

In some embodiments, the treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the treated solid oxide exhibits Lewis or Brønsted acidity that is typically greater than the Lewis or Brønsted acid strength of the untreated solid oxide, or the treated solid oxide has a greater number of acid sites than the untreated solid oxide, or both.

The electron-withdrawing component used to treat the solid oxide can be any component that increases the Lewis or Brønsted acidity of the solid oxide upon treatment (as compared to the solid oxide that is not treated with the electron-withdrawing anion). In an embodiment, the electron-withdrawing component can be an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, including mixtures and combinations thereof. In addition, other ionic or non-ionic compounds that serve as sources for these electron-withdrawing anions also can be employed.

It is contemplated in certain embodiments that the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof. For instance, the electron-withdrawing anion can comprise fluoride, fluorosulfate, fluoroborate, fluorophosphate, trifluoroacetate, triflate, fluorozirconate, fluorotitanate, or a combination thereof; alternatively, sulfate, bisulfate, triflate, fluoride, chloride, bromide, iodide, or a combination thereof; alternatively, fluoride, chloride, bromide, iodide, or a combination thereof; alternatively, sulfate; alternatively, bisulfate; alternatively, fluoride; alternatively, chloride; alternatively, bromide; alternatively, iodide; alternatively, fluorosulfate; alternatively, fluoroborate (also referred to as tetrafluorborate); alternatively, phosphate; alternatively, fluorophosphate; alternatively, trifluoroacetate; alternatively, triflate; alternatively, fluorozirconate; alternatively, fluorotitanate; or alternatively, phospho-tungstate.

In another embodiment, the treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In some embodiments, the treated solid oxide can comprise fluorided alumina, chlorided alumina, sulfated alumina, fluorided silica-alumina, chlorided silica-alumina, sulfated silica-alumina, or a combination thereof; alternatively, fluorided silica-coated alumina, sulfated silica-coated alumina, phosphated silica-coated alumina, or a combination thereof; alternatively, fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; or alternatively, fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the treated solid oxide to the desired level. Combinations of electron-withdrawing components can be contacted with the oxide material simultaneously or individually, and in any order that affords the desired treated solid oxide acidity. For example, one embodiment contemplated herein can employ two or more electron-withdrawing anion source compounds in two or more separate contacting steps.

Thus, one example of such a process by which a treated solid oxide can be prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

Various processes can be used to form the treated solid oxide. The treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare treated solid oxides have been reported, for example, in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

The method by which the oxide can be contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide and electron-withdrawing anion can be calcined.

The treated solid oxide can be produced by a process comprising:
1) contacting a solid oxide (or solid oxides) with an electron-withdrawing anion source compound (or compounds) to form a first mixture; and
2) calcining the first mixture to form the treated solid oxide.

In another embodiment, the treated solid oxide can be produced by a process comprising:
1) contacting a solid oxide (or solid oxides) with a first electron-withdrawing anion source compound to form a first mixture;
2) calcining the first mixture to produce a calcined first mixture;
3) contacting the calcined first mixture with a second electron-withdrawing anion source compound to form a second mixture; and
4) calcining the second mixture to form the treated solid oxide.

Calcining of the treated solid oxide generally can be conducted in an ambient atmosphere. In some embodiments, the calcining of the treated solid oxide can be conducted in a dry ambient atmosphere. Calcining can be conducted at a temperature of from 200° C. to 900° C., or alternatively, at a temperature from 300° C. to 800° C., or alternatively, at a temperature of from 400° C. to 700° C. Calcining can be conducted for a time period of from 1 minute to 100 hours, or from 30 minutes to 50 hours, or from 1 hour to 15 hours. Thus, for example, calcining can be carried out for 1 to 10 hours at a temperature of from 350° C. to 550° C. Any suitable ambient atmosphere can be employed during calcining Generally, calcining can be conducted in an oxidizing atmosphere, such as air. Alternatively, an inert atmosphere, such as nitrogen or argon, or a reducing atmosphere, such as hydrogen or carbon monoxide, can be used.

In an embodiment, the solid oxide material can be treated with a source of halide ion, sulfate ion, or a combination of anions, and then calcined to provide the treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), a source of bromide ion (termed a "bromiding agent"), or a combination thereof, and calcined to provide the treated solid oxide catalyst component.

The treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide can treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this embodiment include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining Silicon tetrafluoride ($SiF_4$) and compounds containing tetrafluoroborate ($BF_4^-$) also can be employed. One convenient method of contacting the solid oxide with the fluoriding agent is to vaporize a fluoriding agent into a gas stream used to fluidize the solid oxide during calcination.

Similarly, in another embodiment, the treated solid oxide can comprise a chlorided solid oxide in the form of a particulate solid. The chlorided solid oxide can be formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally can be from 1 to 50% by weight, where the weight percent is based on the weight of the solid oxide, for example, silica-alumina, before calcining. According to another embodiment, the amount of fluoride or chloride ion present before calcining the solid oxide can be from 1 to 25% by weight, and according to another embodiment, from 2 to 20% by weight. According to yet another embodiment, the amount of fluoride or chloride ion present before calcining the solid oxide can be from 4 to 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

In yet another embodiment, the treated solid oxide can comprise a sulfated solid oxide in the form of a particulate solid. In one embodiment, the sulfated solid oxide can comprise sulfate and alumina. In some instances, the sulfated alumina can be formed by a process wherein the alumina is treated with a sulfate source, for example, sulfuric acid or a sulfate salt such as ammonium sulfate. This process can be performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

In an embodiment, the amount of sulfate ion present before calcining can be from 0.5 to 100 parts by weight sulfate ion to 100 parts by weight solid oxide. In another embodiment, the amount of sulfate ion present before calcining can be from 1 to 50 parts by weight sulfate ion to 100 parts by weight solid oxide, and according to still another embodiment, from 5 to 30 parts by weight sulfate ion to 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

Molecular Sieves and Zeolites

In some embodiments, the first and/or reduced catalyst component can comprise (or consist essentially of, or consist of) a molecular sieve or zeolite, including combinations of two or more molecular sieves and/or zeolites. Generally, a zeolite is considered to be an aluminosilicate material, while a molecular sieve is generally considered to be a broader term, which can include an aluminosilicate, an aluminophosphate, a silicoaluminophosphate, and other like materials. Materials of these types are generally and collectively referred to in this disclosure "molecular sieves or zeolites." Molecular sieve or zeolite materials disclosed in the following publications, each of which is incorporated herein by reference in its entirety, are also considered to be within the scope of the "molecular sieves or zeolites" of this disclosure: "A Review of Zeolite-Like Porous Materials," *Microporous and Mesoporous Materials,* 37 (2000), 243-252; "Zeolite and Molecular Sieve Synthesis," *Chem. Mater.,* 1992, 4, 756-768; "Zeolites and Molecular Sieves: Not Just Ordinary Catalysts," *Ind. Eng. Chem. Res.,* 1991, 30, 1675-1683; "Atlas of Zeolite Structure Types," *Structure Commission of the International Zeolite Association*, Butterworth & Co., 1987, 1-11; and "Hydrothermal Chemistry of Zeolites," *Academic Press,* 1982, 1-43.

In some embodiments, the molecular sieve or zeolite can comprise a Y-zeolite, X-zeolite, USY-zeolite, ZSM, MCM, SSZ, SAPO, ALPO, or any combination thereof, while in other embodiments, the molecular sieve or zeolite can comprise a Y-zeolite; alternatively, a X-zeolite; alternatively, a USY-zeolite; alternatively, a ZSM; alternatively, a MCM; alternatively, a SSZ; alternatively, a SAPO; or alternatively, an ALPO. Yet, in another embodiment, the molecular sieve or zeolite can comprise LZY-54, ZSM-5, MCM-41, MCM-22, HZSM-5, H-BEA, HY, Fe-substituted LTL, ITQ-6, delaminated zeolite, ITQ-2 delaminated zeolite, or any combination thereof. Further, in some embodiments, the molecular sieve or zeolite can comprise LZY-54; alternatively, ZSM-5; alternatively, MCM-41; alternatively, MCM-22; alternatively, HZSM-5; alternatively, H-BEA; alternatively, HY; alternatively, Fe-substituted LTL; alternatively, ITQ-6; alternatively, delaminated zeolite; or alternatively, ITQ-2 delaminated zeolite.

Clays and Pillared Clays

In some embodiments, the first and/or reduced catalyst component can comprise (or consist essentially of, or consist of) a clay or pillared clay. Optionally, the clay or pillared clay can be acid-functionalized, base-functionalized, treated to increase its hydrophobicity, or combination of such treatments. For instance, the clay or pillared clay optionally can be treated with fluoride, chloride, sulfate, etc., or combinations of various electron-withdrawing anions.

The clay or pillared clay materials that can be employed as catalysts in the disclosed processes can encompass clay materials either in their natural state or that have been treated with various ions by wetting, ion exchange, pillaring, or other process. In some embodiments, the clay or pillared clay material can comprise clays that have been ion exchanged with large cations, including polynuclear, highly charged metal complex cations. In other embodiments, the clay or pillared clay material can comprise clays that have been ion exchanged with simple salts, including, but not limited to, salts of Al(III), Fe(II), Fe(III), and Zn(II) with ligands such as halide, acetate, sulfate, nitrate, nitrite, and the like.

In another embodiment, the clay or pillared clay material can comprise a pillared clay. The term "pillared clay" can be used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring generally refers to a simple exchange reaction in which the exchangeable cations of a clay material can be replaced with large, highly charged ions, such as Keggin ions. These polymeric cations are then immobilized within the interlayers of the clay, and when calcined can be converted to metal oxide "pillars," effectively supporting the clay layers as column-like structures. Thus, once the clay has been dried and calcined to produce the supporting pillars between clay layers, the expanded lattice structure can be maintained and the porosity can be enhanced. The resulting pores can vary in shape and size as a function of the pillaring material and the parent clay material used, among other variables. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060, 480; the disclosures of which are incorporated herein by reference in their entirety.

In some embodiments, the clay or pillared clay can comprise montmorillonite, bentonite, nontronite, hectorite, laponite, halloysite, vermiculite, mica, fluoromica, chlorite, sepiolite, attapulgite, palygorskite, illite, saponite, allophone, smectite, and the like, or any combination thereof. Suitable clay materials for pillaring can include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; fibrous clays such as sepiolites, attapulgites, and palygorskites; a serpentine clay; illite; laponite; saponite; and the like, or combinations thereof. In one embodiment, the clay or pillared clay can comprise bentonite, montmorillonite, or a combination thereof; alternatively, bentonite; or alternatively, montmorillonite.

Pillared clays can be pretreated, if desired. For example, a pillared bentonite can be pretreated by drying at 300° C. under an inert atmosphere (e.g., dry nitrogen) for 3 hours, before being fed to a comminution device and/or to a polymerization reactor.

Other First and Reduced Catalyst System Components

In some embodiments, the first and/or reduced catalyst component can comprise (or consist essentially of, or consist of) a transition metal supported on, impregnated onto, and/or mixed or cogelled with a carrier. While not limited thereto, the first and/or reduced catalyst system component can comprise a transition metal such as chromium, vanadium, titanium, zirconium, hafnium, and the like, or a combination thereof. The transition metal compound, whether a metallocene compound, chromium compound, or other, can be supported on, impregnated onto, and/or mixed or cogelled with any of a number of porous carriers including, but not limited to, solid oxides, activator-supports (chemically-treated solid oxides), molecular sieves and zeolites, clays and pillared clays, and the like.

In certain embodiments, the first and/or reduced catalyst component can comprise (or consist essentially of, or consist of) a finished catalyst system, or active catalyst system, and are not merely a component of the catalyst system. That is, the first and/or reduced catalyst component can be the catalyst system, which has catalytic activity in the absence of additional catalyst system components, such as activators and/or co-catalysts. For example, the first catalyst system component (and/or the reduced catalyst system component) can comprise chromium impregnated onto silica, chromium impregnated onto silica-titania, chromium impregnated onto aluminophosphate, chromium cogelled with silica, chromium cogelled with silica-titania, chromium cogelled with aluminophosphate, etc., and this includes any combinations of these materials. In some embodiments, these materials (e.g., a first catalyst system component comprising chromium impregnated onto silica-titania) can be calcined prior to being fed to the comminution device and/or to the polymerization reactor, and such materials can have catalytic activity in the absence of traditional activators and/or co-catalysts. The calcining conditions can include any time/temperature ranges disclosed herein, for instance, at a temperature from 300° C. to 800° C., from 400° C. to 700° C., or from 350° C. to 550° C., for a time period of from 30 minutes to 50 hours, from 1 hour to 15 hours, or from 1 to 10 hours.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Constructive Examples 1-5

The constructive examples are provided to demonstrate illustrative examples of the implementation of a polymerization reactor system with a comminution device for the control, adjustment, and/or optimization of the solids concentration (which can impact the production rate) of a loop slurry reactor producing ethylene-hexene copolymers. A 27,000 gallon loop reactor can be equipped with a high-performance circulation pump that is used to circulate isobutane, catalyst, and polymer around a 2-ft diameter pipe loop. The pump includes a marine-type propeller that rotates at several thousand rpm to drive the slurry, and can operate at about 600 psig.

A catalyst, such as Cr/silica, can be obtained from W.R. Grace & Company. This catalyst can be calcined (activated) at about 785° C. The catalyst can have a pore volume of about 1.6 mL/g, a surface area of about 285 $m^2/g$, and contain 1% Cr. The catalyst can have a larger than normal particle size. That is, instead of a standard 100 micron average particle size that is typical of a grade such as 969 MPI, the larger size catalyst can have a Gaussian particle size distribution with an average particle size of about 300 microns. Because of this larger particle size, the catalyst is low in fines (~1% fines thru 270 mesh), and it is possible to increase the air velocity during the activation step from a standard 0.24 ft/sec up to about 0.45 ft/sec, or more, without plugging the internal filters. Such high air velocities are not possible with the standard 100 micron catalysts, because more of the finer particles can become entrained in the filters. This higher air velocity can increase the conversion of the initial Cr(III) to Cr(VI), from a typical 0.44 wt. % Cr(VI) for the 100 micron catalyst, up to about 0.67 wt. % Cr, or more, for the 300 micron catalyst. Because of the higher Cr(VI) conversion, the activity and melt index potential of the catalyst can be considerably improved (e.g., over 10%, and up to 20-25%).

Unfortunately, this 300 micron catalyst cannot be fed directly into standard polymerization reactor equipment because the large catalyst particles tend to make large polymer particles, which are more difficult to circulate in a loop slurry reactor. Larger polymer particles often have a higher terminal velocity, which increases resistance to flow. In turn, the pump load increases, and eventually the pump may shut down, unless the solids levels in the reactor are reduced to ease the load. Furthermore, the larger polymer particles have a greater tendency to be broken by the circulation pump, producing polymer fines that can cause downstream transfer problems. In fact, this break-up of larger polymer particles is often the main source of polymer fines. Unexpectedly, however, and consistent with embodiments disclosed herein, it is possible, and even advantageous, to use the larger 300 micron catalyst.

Figure 2:
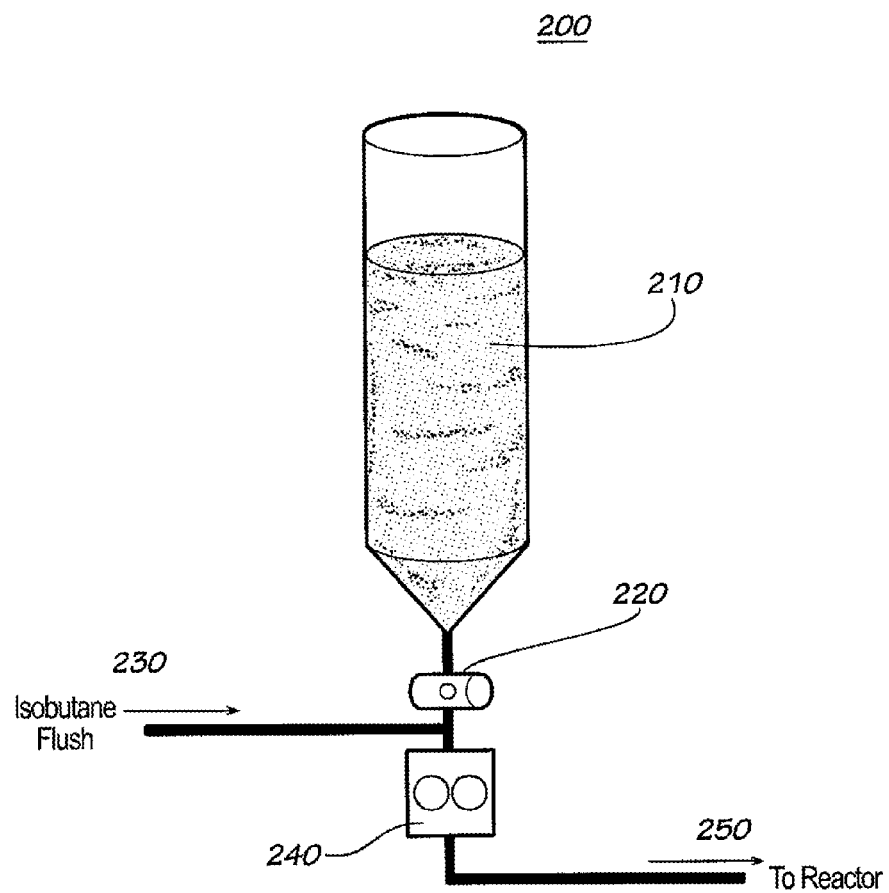
FIG. 2 presents a representative catalyst feed section of a polymerization reactor system containing a comminution device.

Referring now to FIG. 2, a representative catalyst feed section 200 of a polymerization reactor system containing a comminution device is illustrated. Catalyst is stored in a large catalyst storage tank 210 under isobutane liquid at a higher pressure (e.g., 650-750 psig) than the slurry reactor. Below the storage tank 210 is a ball-check feeder 220, through which catalyst can be fed to the reactor. The ball-check feeder can include a 3-inch solid steel cylinder inserted into a cylindrical receptacle and configured to turn. The steel cylinder contains a small hole, so that when the valve is properly aligned, the valve allows catalyst to flow from the storage tank 210 into the reactor 250. An isobutane flush 230 joins the catalyst flow and transports it to the reactor 250. A "shot" of catalyst can be injected into the reactor intermittently by quickly rotating the valve 180 degrees from closed to closed, but briefly passing through the open position, which allows a shot of catalyst to enter. Alternatively, the hole in the solid steel cylinder can also contain a movable ball or plug which allows the hole to be filled more slowly by gravity during the open position for several seconds. The plug prevents catalyst from moving through the hole because the hole has stops on both ends. Thus, in this method of operation, the valve can be rotated 180 degrees from open to open, which allows the plug to accurately inject the precise catalyst shot, and only that amount, while the other side of the hole then fills for the next rotation.

Figure 3:
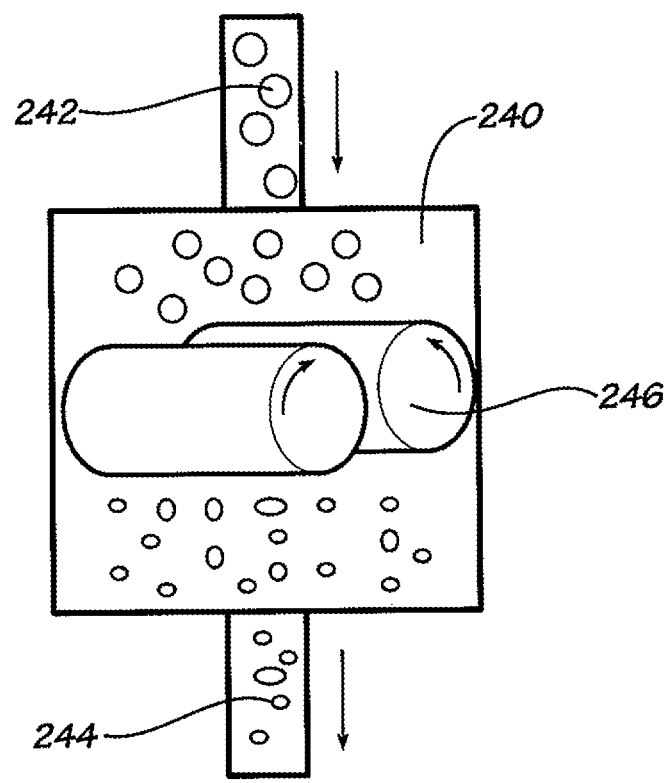
FIG. 3 presented an expanded view of the comminution device of FIG. 2.

In FIG. 2, there is a comminution device 240 below the catalyst feeder 220, and this comminution device can include two rotating rollers 246, as shown in FIG. 3, that are spaced apart so that they do not touch each other, leaving a gap for the catalyst-isobutane flow to pass through. Larger particles 242 enter the rollers 246, and smaller particles 244 exit, and the size of smaller particles 244 can depend upon the gap distance between the rollers 246, which can be controlled or adjusted by moving the rollers either closer or farther apart. In these examples, the gap distance is set so that the largest catalyst particles are crushed or reduced in size as they pass through the roller gap. The rollers can be roughened slightly, so that the larger incoming particles do not slip on the rotating rollers and/or clog the gap, but instead are selectively reduced in size and moved through the gap, leaving the smaller particles intact. Also, in these examples, the gap can be set to various distances ranging from 20 to 1000 microns, so that all particles larger than the gap distance are reduced to the size of the gap distance or smaller. The isobutane flush 230 can be used to convey the smaller particles 244 into the reactor 250.

In these examples, the reactor solids content is held constant at about 44 wt. %, unless otherwise indicated, by varying the amount of isobutane flush into the reactor. Ethylene is added to the reactor to maintain about 4.2 wt. % of the isobutane loading, while 1-hexene is added to maintain a constant 0.5 wt. %. The reaction temperature can be about 102° C. In Constructive Example 1, the standard 100 micron 969 MPI grade catalyst is used, and the gap in the catalyst crusher is set at 1000 microns, so that all of the catalyst particles enter the reactor unaffected. The pump power consumption is about 350 kW, the slurry density is about 29.2 lb/ft$^3$, and the average size of polymer particles is about 800 microns.

In Constructive Example 2, the 300 micron catalyst is introduced with no other changes. Catalyst activity and productivity decline almost immediately. The pump power consumption increases to up to unacceptable level of 400 kW, or more. The size of the polymer particles increases to an average of 1300 microns, but the amount of fines in the polymer slurry also increases.

In Constructive Example 3, from the final conditions of Constructive Example 2, the gap distance on the comminution device (catalyst crusher) is adjusted based on a target pump power consumption in the slurry reactor of about 350 kW. The gap distance is slowly decreased, and the power consumption subsequently decreases. When the gap distance reaches about 105 microns, the pump power consumption again reaches about 350 kW. Since this was the set point, no further narrowing of the gap distance occurs.

In Constructive Example 4, the gap distance on the catalyst crusher is set in automatic control or adjustment mode, with instructions to minimize the pump power consumption in the reactor. The gap distance is narrowed until it reaches about 28 microns, and the pump power reaches about 290 kW. At this catalyst particle size, the resultant polymer particle size may be too small (e.g., average of about 250 microns) to handle conveniently downstream, so the gap distance can be increased to 60 microns. At these conditions, the pump power consumption is about 315 kW, and the polymer particle size is easy to handle (e.g., average of about 450 microns). For this polymer resin grade produced under these conditions, the 60 micron gap distance produces an optimum particle size.

In Constructive Example 5, the final conditions of Constructive Example 4 are used as a starting point. With the reduced pump power consumption at a 60 micron gap distance, the polymer production rate can be increased until the pump power consumption again reaches about 350 kW. Solids level is now increased to about 46.5 wt. %.

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1

A polymerization reactor system comprising:
(a) a comminution device configured to reduce a first catalyst system component, having a first average particle size, to produce a reduced catalyst system component having a reduced average particle size;
(b) a polymerization reactor configured to contact a transition metal-based catalyst system comprising the reduced catalyst system component with an olefin monomer under polymerization conditions to produce an olefin polymer; and (c) a controller operative to control the reduced average particle size according to a process variable in the polymerization reactor system and/or according to a property of the olefin polymer.

Embodiment 2

The system defined in embodiment 1, wherein the comminution device comprises an impact crusher, a hammer mill, a jet mill, a roll mill, a roll crusher, a jaw crusher, an ultrasonic device, or any combination thereof.

Embodiment 3

The system defined in any of the preceding embodiments, wherein an output of the comminution device feeds directly into the polymerization reactor.

Embodiment 4

The system defined in any of the preceding embodiments, wherein the controller controls and/or adjusts an output rate of the comminution device (e.g., the amount of the reduced catalyst system component) that enters the polymerization reactor.

Embodiment 5

The system defined in any of the preceding embodiments, wherein the controller operative to control the average particle size of the reduced catalyst system component (the reduced average particle size) comprises a controller operative to receive information on the process variable and/or the property of the olefin polymer (e.g., from a sensor), to identify a new target average particle size of the reduced catalyst system component (e.g., increase or decrease the size of the reduced catalyst system component to achieve a desired impact on the process variable and/or on the property of the olefin polymer), and to provide a control signal to the comminution device operative to change the amount of size reduction performed by the comminution device.

Embodiment 6

The system defined in any of the preceding embodiments, wherein the controller comprises a processing unit.

Embodiment 7

The system defined in any of the preceding embodiments, further comprising a particle size analyzer for determining the reduced average particle size.

Embodiment 8

The system defined in embodiment 7, wherein the particle size analyzer is an in-process particle size analyzer.

Embodiment 9

A method of operating a polymerization reactor system, or for controlling a polymerization reaction in a polymerization reactor system, the method comprising:

(i) reducing an average particle size of a first catalyst system component to produce a reduced catalyst system component having a reduced average particle size;

(ii) introducing a transition metal-based catalyst system comprising the reduced catalyst system component and an olefin monomer into a polymerization reactor within the polymerization reactor system;

(iii) contacting the transition metal-based catalyst system comprising the reduced catalyst system component with the olefin monomer under polymerization conditions to produce an olefin polymer;

(iv) monitoring a process variable in the polymerization reactor system and/or a property of the olefin polymer, and (v) when the process variable and/or the property has/have reached a predetermined level, adjusting the reduced average particle size.

Embodiment 10

The method defined in embodiment 9, wherein the particle size is reduced using a comminution device, such as an impact crusher, a hammer mill, a jet mill, a roll mill, a roll crusher, a jaw crusher, an ultrasonic device, or any combination thereof.

Embodiment 11

The method defined in embodiments 9-10, wherein the reduced catalyst system component is introduced directly into the polymerization reactor after step (i).

Embodiment 12

The method defined in embodiments 9-11, wherein the polymerization conditions in step (iii) comprise any polymerization reaction temperature and reaction pressure disclosed herein, such as a polymerization reaction temperature in a range from about 60° C. to about 110° C., and a reaction pressure in a range from about 200 to about 1000 psig (about 1.4 to about 6.9 MPa).

Embodiment 13

The method defined in embodiments 9-12, wherein the reducing step comprises impact, shear, compression, vibration, grinding, crushing, or any combination thereof.

Embodiment 14

The method defined in embodiment 13, wherein the vibration comprises ultrasonic vibration.

Embodiment 15

The method defined in embodiments 9-14, further comprising determining the reduced average particle size (e.g., using in-process particle size analysis, using off-line particle size analysis, etc.).

Embodiment 16

The system or method defined in any of the preceding embodiments, wherein the first catalyst system component (and/or the reduced catalyst system component) comprises a solid oxide.

Embodiment 17

The system or method defined in embodiment 16, wherein the solid oxide comprises silica, alumina, titania, zirconia, magnesia, boria, zinc oxide, a mixed oxide thereof, or any mixture thereof.

Embodiment 18

The system or method defined in embodiment 16, wherein the solid oxide comprises silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof.

Embodiment 19

The system or method defined in embodiment 16, wherein the solid oxide comprises silica, silica-titania, aluminophosphate, or a combination thereof.

Embodiment 20

The system or method defined in any of the preceding embodiments, wherein the first catalyst system component (and/or the reduced catalyst system component) comprises chromium impregnated onto silica, chromium impregnated onto silica-titania, chromium cogelled with silica, chromium cogelled with silica-titania, or any combination thereof.

Embodiment 21

The system or method defined in any of the preceding embodiments, wherein the first catalyst system component is calcined, for example, at conditions inclusive of any of the time/temperature ranges disclosed herein.

Embodiment 22

The system or method defined in embodiments 1-15, wherein the first catalyst system component (and/or the reduced catalyst system component) comprises an activator-support (e.g., a chemically-treated solid oxide).

Embodiment 23

The system or method defined in embodiment 22, wherein the activator-support comprises a solid oxide treated with an electron-withdrawing anion, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof.

Embodiment 24

The system or method defined in embodiments 1-15, wherein the first catalyst system component (and/or the reduced catalyst system component) comprises an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 25

The system or method defined in embodiments 1-15, wherein the first catalyst system component (and/or the reduced catalyst system component) comprises chromium, vanadium, titanium, zirconium, hafnium, or a combination thereof.

Embodiment 26

The system or method defined in any of the preceding embodiments, wherein the transition metal-based catalyst system comprises chromium, vanadium, titanium, zirconium, hafnium, or a combination thereof.

Embodiment 27

The system or method defined in any of the preceding embodiments, wherein the transition metal-based catalyst system is a chromium-based catalyst system, a Ziegler-Natta based catalyst system, a metallocene-based catalyst system, or a combination thereof.

Embodiment 28

The system or method defined in any of the preceding embodiments wherein the transition metal-based catalyst system is a chromium-based catalyst system.

Embodiment 29

The system or method defined in any of the preceding embodiments wherein the transition metal-based catalyst system comprises a transition metal compound, an activator, and optionally, a co-catalyst.

Embodiment 30

The system or method defined in embodiment 29, wherein the activator comprises an aluminoxane compound, an organoboron or organoborate compound, an ionizing ionic compound, or any combination thereof.

Embodiment 31

The system or method defined in embodiment 29, wherein the activator comprises an activator-support comprising a solid oxide treated with an electron-withdrawing anion.

Embodiment 32

The system or method defined in embodiments 29-31, wherein the transition metal compound comprises a metallocene compound.

Embodiment 33

The system or method defined in embodiments 29-31, wherein the transition metal compound comprises a chromium compound.

Embodiment 34

The system or method defined in embodiments 29-33, wherein the co-catalyst comprises an organoaluminum compound comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 35

The system or method defined in any of the preceding embodiments, wherein the olefin monomer comprises a $C_2$-$C_{24}$ olefin, for example, a $C_2$-$C_3$ olefin, a $C_6$-$C_{24}$ olefin, etc.

Embodiment 36

The system or method defined in any of the preceding embodiments, wherein the olefin monomer comprises propylene.

Embodiment 37

The system or method defined in any of embodiments 1-35, wherein the olefin monomer comprises ethylene.

Embodiment 38

The system or method defined in embodiment 37, further comprising contacting an olefin comonomer with the catalyst system and the olefin monomer or introducing an olefin comonomer into the polymerization reactor and contacting the olefin comonomer with the catalyst system and the olefin monomer, wherein the olefin comonomer comprises propylene, 1-butene, 1-pentene, 1-hexene, 1-heptene, 1-octene, 1-decene, styrene, or a mixture thereof.

Embodiment 39

The system or method defined in embodiment 38, wherein the olefin comonomer comprises 1-butene, 1-hexene, 1-octene, or combination thereof.

Embodiment 40

The system or method defined in any of the preceding embodiments, wherein the olefin polymer comprises an ethylene homopolymer, an ethylene copolymer, a propylene homopolymer, a propylene random copolymer, a propylene block copolymer, or a combination thereof.

Embodiment 41

The system or method defined in embodiments 1-39, wherein the olefin polymer comprises an olefin dimer, olefin trimer, olefin tetramer, or a combination thereof.

Embodiment 42

The system or method defined in any of the preceding embodiments, wherein the reduced average particle size is monitored and/or adjusted and/or controlled continuously.

Embodiment 43

The system or method defined in any of the preceding embodiments, wherein the average particle size of the first catalyst system component (first average particle size) is greater than any first average particle size or in any range disclosed herein, for example, at least about 100 microns, at least about 200 microns, or in a range from about 200 to about 1000 microns.

Embodiment 44

The system or method defined in any of the preceding embodiments, wherein the average particle size of the reduced catalyst system component (reduced average particle size) is less than any reduced average particle size or in any range disclosed herein, for example, less than about 75 microns, less than about 25 microns, or in a range from about 1 to about 50 microns.

Embodiment 45

The system or method defined in any of the preceding embodiments, wherein a ratio of the first average particle size to the reduced average particle size is in any range disclosed herein, for example, in a range from about 1.5:1 to about 100:1, from about 1.5:1 to about 15:1, or from about 1.5:1 to about 5:1.

Embodiment 46

The system or method defined in any of the preceding embodiments, wherein the polymerization reactor system comprises a slurry reactor, a gas-phase reactor, a solution reactor, or a combination thereof.

Embodiment 47

The system or method defined in any of the preceding embodiments, wherein the polymerization reactor system comprises a loop slurry reactor, two or more loop slurry reactors in series, a fluidized bed reactor, two or more fluidized bed reactors in series, or a fluidized bed reactor and a loop slurry reactor.

Embodiment 48

The system or method defined in any of the preceding embodiments, wherein the polymerization reactor system comprises a loop slurry reactor or a fluidized bed reactor.

Embodiment 49

The system or method defined in any of the preceding embodiments, wherein the process variable in the polymerization reactor system and/or the property of the olefin polymer comprise(s) an average particle size of the olefin polymer, a maximum particle size of the olefin polymer, a particle size distribution of the olefin polymer, a bulk density of the olefin polymer, a production rate of the olefin polymer, a catalyst activity of the transition metal-based catalyst system, a heat transfer coefficient of the polymerization reactor, a percent solids in a loop slurry reactor, a slurry density in a loop slurry reactor, a circulation velocity of a slurry in a loop slurry reactor, a pump pressure drop in a loop slurry reactor, a pump power consumption in a loop slurry reactor, a fluidizing gas velocity in a fluidized bed reactor, a bed density in a fluidized bed reactor, a bed height in a fluidized bed reactor, a gas/powder ratio in a fluidized bed reactor, a static build-up in a fluidized bed reactor, or any combination thereof.

We claim:
1. A polymerization reactor system comprising:
   (a) a comminution device configured to reduce a first catalyst system component, having a first average particle size, to produce a reduced catalyst system component having a reduced average particle size;
   (b) a polymerization reactor configured to contact a transition metal-based catalyst system comprising the reduced catalyst system component with an olefin monomer under polymerization conditions to produce an olefin polymer; and
   (c) a controller operative to control the reduced average particle size according to a process variable in the polymerization reactor system and/or according to a property of the olefin polymer;
   wherein the polymerization reactor is a single loop slurry reactor, more than one loop slurry reactor, a combination of a loop slurry reactor and a gas phase reactor, or a combination of a loop slurry reactor and a solution reactor.

2. The system of claim 1, wherein the comminution device comprises an impact crusher, a hammer mill, a jet mill, a roll mill, a roll crusher, a jaw crusher, an ultrasonic device, or any combination thereof.

3. The system of claim 1, wherein:
   the controller controls and/or adjusts an output rate of the comminution device; and
   an output of the comminution device feeds directly into the polymerization reactor.

4. The system of claim 1, wherein:
   the transition metal-based catalyst system comprises chromium, vanadium, titanium, zirconium, hafnium, or any combination thereof; and
   the first catalyst system component comprises a solid oxide, an activator-support, or any combination thereof; and wherein:
   the first average particle size is in a range from about 200 to about 1000 microns;
   the reduced average particle size is in a range from about 5 to about 70 microns;
   a ratio of the first average particle size to the reduced average particle size is in a range from about 1.5:1 to about 25:1; or
   any combination thereof.

5. The system of claim 4, wherein the olefin monomer comprises ethylene or propylene.

6. The system of claim 4, wherein the olefin polymer comprises an ethylene homopolymer, a propylene homopolymer, an ethylene copolymer, a propylene copolymer, or any combination thereof.

7. The system of claim 1, wherein the transition metal-based catalyst system is a chromium-based catalyst system, a Ziegler-Natta based catalyst system, a metallocene-based catalyst system, or a combination thereof; and wherein the process variable in the polymerization reactor system and/or the property of the olefin polymer comprise(s):
   an average particle size of the olefin polymer;
   a maximum particle size of the olefin polymer;
   a particle size distribution of the olefin polymer;
   a bulk density of the olefin polymer;
   a production rate of the olefin polymer;
   a catalyst activity of the transition metal-based catalyst system;
   a percent solids in the loop slurry reactor;
   a slurry density in the loop slurry reactor;
   a circulation velocity in the loop slurry reactor;
   a pump pressure drop in the loop slurry reactor;
   a pump power consumption in the loop slurry reactor;
   a heat transfer coefficient of the loop slurry reactor; or
   any combination thereof.

8. The system of claim 7, wherein:
   the first catalyst system component comprises a solid oxide, an activator-support, or any combination thereof;
   the olefin monomer comprises ethylene or propylene;
   the first average particle size is in a range from about 200 to about 1000 microns; and
   the reduced average particle size is in a range from about 5 to about 70 microns.

9. The system of claim 8, wherein an output of the comminution device feeds directly into the polymerization reactor.

10. A polymerization reactor system comprising:
    (a) a comminution device configured to reduce a first catalyst system component, having a first average particle size, to produce a reduced catalyst system component having a reduced average particle size;
    (b) a polymerization reactor configured to contact a transition metal-based catalyst system comprising the reduced catalyst system component with an olefin monomer under polymerization conditions to produce an olefin polymer; and
    (c) a controller operative to control the reduced average particle size according to a process variable in the polymerization reactor system and/or according to a property of the olefin polymer;
    wherein the polymerization reactor is a single fluidized bed reactor, more than one fluidized bed reactor, a combination of a fluidized bed reactor and a slurry reactor, or a combination of a fluidized bed reactor and a solution reactor; and
    wherein the process variable in the polymerization reactor system and/or the property of the olefin polymer comprise(s):
    a fluidizing gas velocity in the fluidized bed reactor;
    a bed density in the fluidized bed reactor;
    a bed height in the fluidized bed reactor;
    a gas/powder ratio in the fluidized bed reactor;
    a static build-up in the fluidized bed reactor; or
    any combination thereof.

11. The system of claim 10, wherein the comminution device comprises an impact crusher, a hammer mill, a jet mill, a roll mill, a roll crusher, a jaw crusher, an ultrasonic device, or any combination thereof.

12. The system of claim 10, wherein:
    the controller controls and/or adjusts an output rate of the comminution device; and
    an output of the comminution device feeds directly into the polymerization reactor.

13. The system of claim 10, wherein:
    the transition metal-based catalyst system comprises chromium, vanadium, titanium, zirconium, hafnium, or any combination thereof; and
    the first catalyst system component comprises a solid oxide, an activator-support, or any combination thereof; and wherein:
    the first average particle size is in a range from about 200 to about 1000 microns;
    the reduced average particle size is in a range from about 5 to about 70 microns;
    a ratio of the first average particle size to the reduced average particle size is in a range from about 1.5:1 to about 25:1; or
    any combination thereof.

14. The system of claim 13, wherein the olefin monomer comprises ethylene or propylene.

15. The system of claim 13, wherein the olefin polymer comprises an ethylene homopolymer, a propylene homopolymer, an ethylene copolymer, a propylene copolymer, or any combination thereof.

16. The system of claim 10, wherein the transition metal-based catalyst system is a chromium-based catalyst system, a Ziegler-Natta based catalyst system, a metallocene-based catalyst system, or a combination thereof; and wherein the process variable in the polymerization reactor system and/or the property of the olefin polymer further comprise(s):
- an average particle size of the olefin polymer;
- a maximum particle size of the olefin polymer;
- a particle size distribution of the olefin polymer;
- a bulk density of the olefin polymer;
- a production rate of the olefin polymer;
- a catalyst activity of the transition metal-based catalyst system;
- a heat transfer coefficient of the fluidized bed reactor; or any combination thereof.

17. The system of claim 10, wherein:
- the first catalyst system component comprises a solid oxide, an activator-support, or any combination thereof;
- the olefin monomer comprises ethylene or propylene;
- the first average particle size is in a range from about 200 to about 1000 microns; and
- the reduced average particle size is in a range from about 5 to about 70 microns.

18. The system of claim 17, wherein an output of the comminution device feeds directly into the polymerization reactor.

19. A method of operating a polymerization reactor system, the method comprising:
(i) reducing an average particle size of a first catalyst system component to produce a reduced catalyst system component having a reduced average particle size, wherein the first catalyst system component comprises an activator-support comprising a solid oxide treated with an electron-withdrawing anion;
(ii) introducing a transition metal-based catalyst system comprising the reduced catalyst system component and an olefin monomer into a polymerization reactor within the polymerization reactor system, wherein the polymerization reactor system comprises a loop slurry reactor;
(iii) contacting the transition metal-based catalyst system comprising the reduced catalyst system component with the olefin monomer under polymerization conditions to produce an olefin polymer;
(iv) monitoring a process variable in the polymerization reactor system and/or a property of the olefin polymer, and
(v) when the process variable and/or the property has/have reached a predetermined level, adjusting the reduced average particle size.

20. The method of claim 19, wherein the process variable in the polymerization reactor system and/or the property of the olefin polymer comprise(s):
- an average particle size of the olefin polymer;
- a maximum particle size of the olefin polymer;
- a particle size distribution of the olefin polymer;
- a bulk density of the olefin polymer;
- a production rate of the olefin polymer;
- a catalyst activity of the transition metal-based catalyst system;
- a heat transfer coefficient of the polymerization reactor; or any combination thereof.

21. The method of claim 19, wherein:
- the transition metal-based catalyst system comprises chromium, vanadium, titanium, zirconium, hafnium, or any combination thereof; and
- the olefin monomer comprises ethylene or propylene; and wherein:
- the first average particle size is in a range from about 200 to about 1000 microns;
- the reduced average particle size is in a range from about 5 to about 70 microns;
- a ratio of the first average particle size to the reduced average particle size is in a range from about 1.5:1 to about 25:1; or any combination thereof.

22. The method of claim 21, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

23. The method of claim 19, wherein:
- the reducing step comprises impact, shear, compression, vibration, grinding, crushing, or any combination thereof.

* * * * *